Sept. 29, 1970      R. C. WOERNER      3,531,541

FOULING REDUCTION IN OXIDATIVE DEHYDROGENATION PROCESS

Filed Nov. 14, 1968

Rudolph C. Woerner
INVENTOR.

BY
ATTORNEY

United States Patent Office 3,531,541
Patented Sept. 29, 1970

3,531,541
FOULING REDUCTION IN OXIDATIVE
DEHYDROGENATION PROCESS
Rudolph C. Woerner, Houston, Tex., assignor to Petro-Tex Chemical Corporation, Houston, Tex., a corporation of Delaware
Filed Nov. 14, 1968, Ser. No. 775,632
Int. Cl. C07c 3/00, 7/00, 5/18
U.S. Cl. 260—680                              18 Claims

ABSTRACT OF THE DISCLOSURE

Reducing fouling of compressor pistons and cylinders used for the compression of gaseous compositions comprising unsaturated organic compounds and carbonyl compounds by spraying water into the suction side of the compressor. Preferred source of gaseous composition is from oxidative dehydrogenation process.

BACKGROUND OF THE INVENTION

Field of the invention

This application relates to the mechanical compression of gaseous compositions comprising unsaturated organic compounds and carbonyl compounds. The process is particularly applicable to process for the purification of gases obtained by the oxidative dehydrogenation of organic compounds such as hydrocarbons.

Description of the prior art

It is known to dehydrogenate organic compounds by contacting the organic compound at an elevated temperature with oxygen, such as disclosed in U.S. Pats. Nos. 3,270,080, 3,303,234, 3,303,235, 3,303,236, 3,303,238, 3,308,182 through 3,308,201, 3,324,195, 3,334,152 and 3,342,890.

The dehydrogenation zone effluent from these oxidative dehydrogenation processes is purified by a process including cooling such as by quench, waste heat boilers and the like and generally the next step is to remove a major portion of the water by condensation. Thereafter the gases are compressed in a compressor. However, in these processes considerable difficulty has been encountered due to fouling of the compressor cylinders, pistons and valves. On a periodic basis it has been necessary to disassemble the compressor and clean the contact surfaces in order to prevent breakage due to fouling and plugging. Further, the operation of the compressor is less efficient during build-up of the fouling because, for example, the valves will not properly open and close. Scoring of the piston and cylinder is also possible.

It has previously been suggested to spray water droplets as a non-atomized spray into compressor cylinders utilized to compress water gas contaminated with non-wettable dust. In that instance, the purpose was to scour the contact surfaces with the water droplets to remove the dust. However, in contrast to the problem of physically scouring non-wettable dust from water gas, applicant was faced with the problem of preventing the fouling of compressor surfaces with a polymeric material in a process for the compression of an entirely different gas.

DESCRIPTION OF PREFERRED EMBODIMENTS

The reason for the fouling in the compressor is not fully understood. However, it is believed that the main source of fouling is due to the presence of the various oxygenated compounds and/or unsaturated organic compounds in the gaseous stream being compressed.

Figure 2:
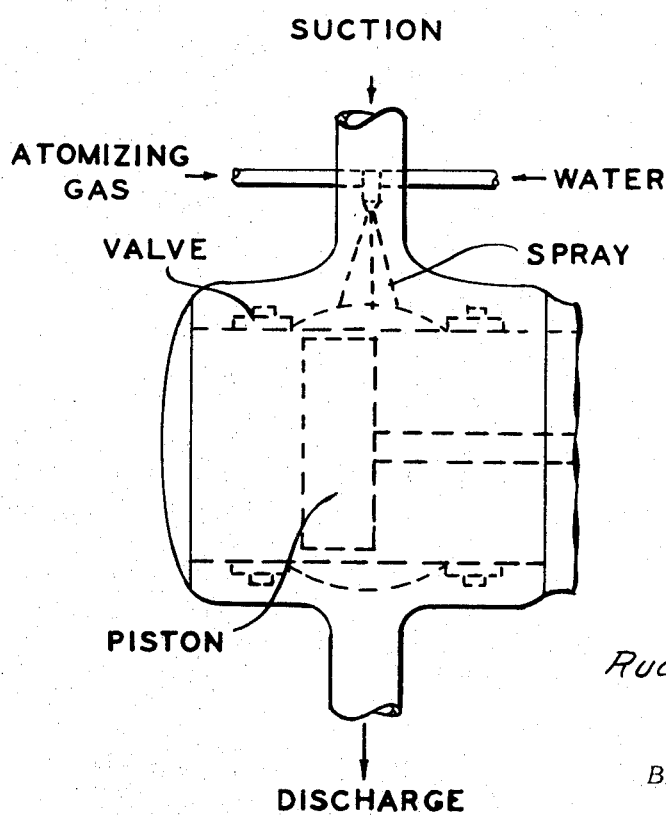

A preferred embodiment of one aspect of the invention is illustrated in FIG. 2 of the drawing wherein the piston and cylinder of a reciprocating compressor is shown. The gaseous composition comprising unsaturated organic compounds contaminated with carbonyl compounds is drawn into the cylinder through the suction line. The suction gases are sprayed with water which has been atomized with a gas in an atomizing nozzle. The gases containing the atomized water are then conducted through an inlet valve into the cylinder for compression.

Figure 1:
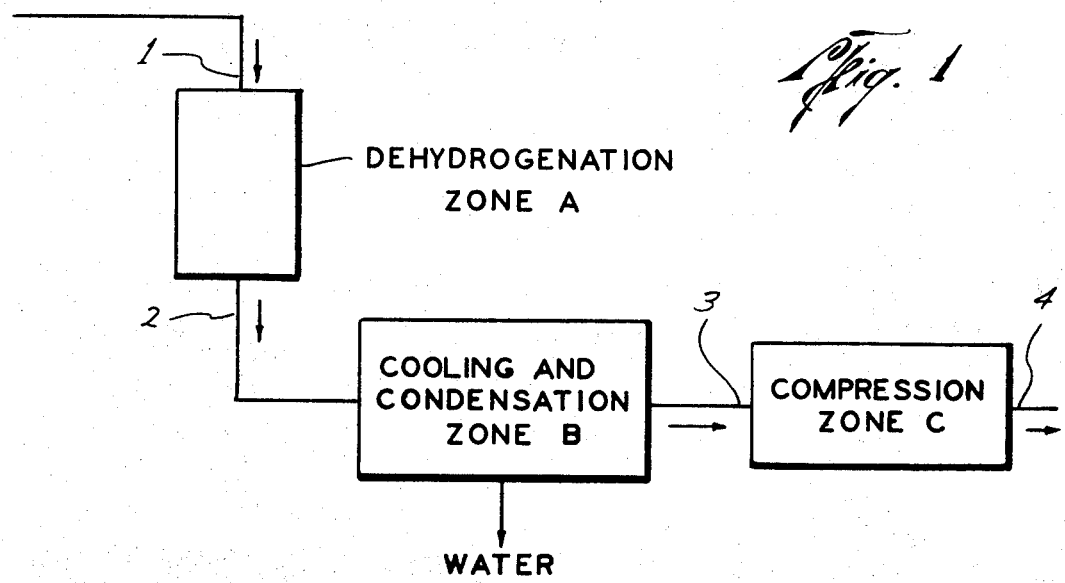

A further preferred embodiment is illustrated in FIG. 1 of the drawing. A gaseous mixture of the compound to be dehydrogenated, air and steam are fed by line 1 to the dehydrogenation zone A. The dehydrogenation reaction may be conducted in the absence of contact catalysts, but better results are obtained if the reaction is conducted in the presence of metal or metal compound catalysts, such as disclosed in the patents cited herein. The dehydrogenation reactor may be a fixed or fluid bed reactor. The conditions of reaction may be as disclosed in any of the cited patents such as U.S. 3,334,152. For convenience, the invention will be illustrated for the dehydrogenation of hydrocarbons but it is understood that other dehydrogenatable organic compounds may be substituted in the example.

The effluent 2 from the dehydrogenation zone will contain the impure unsaturated hydrocarbon products, various impurities including oxygenated hydrocarbons, noncondensable gases [1] and perhaps some unconverted hydrocarbon, oxygen and steam. When air is used as the source of oxygen, nitrogen will be present in relatively large quantities as a noncondensable gas. Steam may optionally be present in an amount up to 96 mol percent of the total effluent, such as from about 5 to 96 mol percent. The organic phase including dehydrogenated product, any unreacted feed, oxygenated hydrocarbons, polymer and tar and precursors thereof and any organic decomposition products usually range from about 1 to 50 mol percent of the effluent and generally will be within the range of or about 3 to 30 or 35 mol percent of the effluent. The noncondensable gases, such as nitrogen or $CO_2$, will usually be present in an amount of from or about 20 to 93 mol percent of the total effluent, but more often will be within the range of about 40 to 80 mol percent.

The effluent gases 2 leaving the dehydrogenation zone will generally be at a temperature of about or greater than 600° F. or 700° F. to 1600° F. depending upon the particular dehydrogenation process. The reactor effluent may be cooled by any means or combination of means in cooling and condensation zone B as by quenching, waste heat boilers, condensers, vapor separators, and the like in any sequence. Preferably, the major portion of any water present in the effluent will be removed as condensed steam from the gaseous effluent during this cooling and condensation operation. This cooled gaseous stream 3 may preferably then be compressed in compression zone C. The invention is not restricted to the particular processes prior to compression zone C. For example, an oil quench or other step may be included.

The gaseous composition 3 to be fed to compression zone C will usually comprise, exclusive of any water present, about about or from 3.5 to 80 mol percent of unsaturated organic compounds such as hydrocarbon, about or from 0.0005 to 2.5 mol percent of carbonyl

---

[1] The term "noncondensable" or "inert noncondensible" gases refers to those gases, other than hydrocarbons, such as nitrogen, $CO_2$ and $CO$, which do not condense under the conditions encountered.

compounds[2], and optionally about or from 20 to 93 mol percent of noncondensable gases (i.e., noncondensable under the conditions at point 3), all based on the total mols of gaseous composition 3 being fed to compression zone C, exclusive of any water. Included in the noncondensable gases will be any nitrogen, oxygen, CO or $CO_2$, and the like. The oxygen content may vary, but suitably will be less than 10 mol percent of 3. Steam may also be present in 3 in an amount from 0 to 20 or up to such as 50 mol percent or more of the gaseous composition 3. Also present in the gaseous mixture 3 may be unconverted hydrocarbons such as olefins or saturated hydrocarbons and hydrocarbon by-products.

A preferred composition 3 to be fed to compression zone C will comprise, exclusive of any water present, about or from 5 to 65 mol percent of unsaturated hydrocarbons, about or from 0.005 to 1.2 mol percent of carbonyl compounds and about or from 45 to 89 mol percent of the noncondensable gases. A particularly preferred composition 3 contains about or from 8 to 65 mol percent butadiene-1,3, about or from 0.1 to 40 mol percent butene, and about or from 40 to 75 mol percent nitrogen. The composition of the compressed gases at 4 may be within the same ranges as given for point 3.

Compression in compression zone C may be by any suitable mechanical compressors such as reciprocating or centrifugal compressors, with the invention being particularly suitable for reciprocating compressors. The invention is particularly suitable for use with double acting pistons. Compressors conventionally employed in the recovery of butadiene-1,3 are suitable such as Clark reciprocating compressors. Preferred are compressors which have the cylinders cooled with a water jacket. The pressure and temperature of the gases discharging from the compressors will depend upon the particular compressor employed, the pressure and type of equipment downstream from the compressor, the temperature of cooling water available and the like, but typically will be at a temperature of at least 125° F. and a pressure of at least 75 p.s.i.g. but generally the temperature will be at least 175° F. and the pressure at least 100 p.s.i.g.

The gases are sprayed with water in the suction side of the compressor, that is the spray is into the gases prior to or during compression. Although the water spray be sprayed directly into the cylinder, it is preferred that the spray be into the gas prior to or as the gas is drawn into the cylinder. Any type of spray may be employed, but it is a feature of this invention that an atomizing type spray is preferred. The atomization facilitates the evaporation of the water. The temperature of the gases during compression are reduced due to the water spray with the reduction in temperature generally being at least 15° F. and preferably the temperature will be reduced by at least 30° F. More than one spray may be employed for each cylinder. Entirely satisfactory results have been obtained by locating the spray as shown in the drawing. When the compression is conducted in several stages, the water spray is generally most effective if employed in the second or subsequent stage of compression. The usual intercoolers between stages may be employed.

The compressed gases may be further treated and purified as desired. One preferred method for handling the compressor discharge is described in my copending application Ser. No. 775,862 entitled "Reducing Fouling in Oxidative Dehydrogenation Processes," filed on even date herewith. In that application, the discharge line from the compressor is sized to provide for a high velocity flow of gases. The discharge gases may be treated by absorbing in an oil absorber such as described in R. C. Woerner et al. U.S. 3,402,215, Sept. 17, 1968. It is a preferred feature of this invention that a portion of the oil absorber overhead gases, referred to as light gases in the patent, may be used as the atomizing gases for the water spray to the compressors according to this invention. By so doing, extraneous contaminants are not introduced into the system.

The process of this invention may be applied to the recovery of products produced by the dehydrogenation of a wide variety of organic compounds. Such compounds normally will contain from 2 to 20 carbon atoms, at least one

grouping, a boiling point below about 350° C., and such compounds may contain other elements, in addition to carbon and hydrogen such as oxygen, halogens, nitrogen and sulphur. Preferred are compounds having from 2 to 12 carbon atoms, and especially preferred are compounds of 3 to 6 or 8 carbon atoms.

Among the types of organic compounds which may be dehydrogenated by means of the process of this invention are nitriles, amines, alkyl halides, ethers, esters, aldehydes, ketones, alcohols, acids, alkyl aromatic compounds, alkyl heterocyclic compounds, cycloalkanes, alkanes, alkenes, and the like. Illustration of dehydrogenations include propionitrile to acrylonitrile, propionaldehyde to acrolein, ethyl chloride to vinyl chloride, methyl isobutyrate to methyl methacrylate, 2-chlorobutene-1 or 2,3 dichlorobutane to chloroprene, ethyl pyridine to vinyl pyridine, ethylbenzene to styrene, isopropylbenzene to α-methyl sytrene, ethylcyclohexane to styrene, cyclohexane to benzene, methane to ethylene and acetylene, ethane to ethylene to acetylene, propane to propylene or methyl acetylene, allene, or benzene, isobutane to isobutylene n-butane to butene and butadiene-1,3, butene to butadiene-1,3 and vinyl acetylene, methyl butene to isoprene, cyclopentane to cyclopentene and cyclopentadiene-1,3 n-octane to ethyl benzene and ortho-xylene, mono methylheptanes to xylenes, propane to propylene to benzene, ethyl acetate to vinyl acetate, 2,4,4-trimethylpentane to xylenes, the formation of new carbon to carbon bonds by the removal of hydrogen atoms such as the formation of a carbocyclic compound from two aliphatic hydrocarbon compounds or the formation of a dicylic compound from a monocyclic compound having an acyclic group such as the conversion of propene to diallyl. Representative materials which are dehydrogenated by the novel process of this invention include ethyl toluene, alkyl chlorobenzenes, ethyl naphthalene, isobutyronitrile, propyl chloride, isobutyl chloride, ethyl fluoride, ethyl bromide, n-pentyl iodide, ethyl dichloride, 1,3 dichlorobutane, 1,4 dichlorobutane, the chlorofluoroethanes, methyl pentane, methylethyl ketone, diethyl ketone, n-butyl alcohol, methyl propionate, and the like.

Suitable dehydrogenation reactions are the following: acyclic compounds having 4 to 5 non-quaternary contiguous carbon atoms to the corresponding olefins, diolefins or acetylenes having the same number of carbon atoms; aliphatic hydrocarbons having 6 to 16 carbon atoms and at least one quaternary carbon atom to aromatic compounds, such as 2,4,4-trimethylpentene-1 to a mixture of xylenes; acyclic compounds having 6 to 16 carbon atoms and no quaternary carbon atoms to aromatic compounds such as n-hexane or the n-hexenes to benzene; cycloparaffins and cycloolefins having 5 to 8 carbon atoms to the corresponding olefin, diolefin or aromatic compound, e.g., cyclohexane to cyclohexene or cyclohexadiene or benzene; aromatic compounds having 8 to 12 carbon atoms including one or two alkyl side chains of 2 to 3 carbon atoms to the corresponding aromatic

---

[2] Except where expressed otherwise, all references in the application are to overall quantities of carbonyl compounds as determined by ASTM Method D-1089 and reported as acetaldehyde. Generally, the carbonyl compounds will have from 2 to 8 carbon atoms, e.g., from 2 to 6 carbon atoms when a $C_4$ to $C_6$ compound is being dehydrogenated, and will have from 1 to 2 carbonyl groups.

with unsaturated side chain such as ethyl benzene to styrene.

The preferred compounds to be dehydrogenated are hydrocarbons with a particularly preferred class being acyclic non-quaternary hydrocarbons having 3 or 4 to 5 contiguous carbon atoms or ethyl benzene and the preferred products are n-butene-1 or 2, butadiene-1,3, vinyl acetylene, 2-methyl-1-butene, 3-methyl-1-butene, 3-methyl-2-butene, isoprene, styrene or mixtures thereof. Especially preferred as feed are n-butene-1 or 2 and the methyl butenes and mixtures thereof such as hydrocarbon mixtures containing these compounds in at least 50 mol percent.

The organic compound to be dehydrogenated is contacted with oxygen in order for the oxygen to oxidatively dehydrogenate the compound. The oxygen may be supplied to the organic compound from any suitable source as by feeding oxygen to a dehydrogenation zone for example as disclosed in U.S. 3,207,810 issued Sept. 21, 1965. Oxygen may be fed to the reactor as pure oxygen, as air, as oxygen-enriched air, oxygen mixed with diluents, and so forth. Oxygen may also be supplied by means of a transport or moving oxidant type of process such as disclosed in U.S. 3,050,572 issued Aug. 21, 1962 or U.S. 3,118,007 issued Jan. 14, 1964. The term oxidative dehydrogenation process when used herein means a process wherein the predominant mechanism of dehydrogenation is by the reaction of oxygen with hydrogen.

The amount of oxygen employed may vary depending upon the desired result such as conversion, selectivity and the number of hydrogen atoms being removed. Thus, to dehydrogenate butane to butene requires less oxygen than if the reaction proceeds to produce butadiene. Normally oxygen will be supplied (including all sources, e.g. air to the reactor or solid oxidant to the reactor) in the dehydrogenation zone in an amount from about 0.2 to 1.5, preferably 0.3 to 1.2, mols per mol of $H_2$ being liberated from the organic compound. Ordinarily the mols of oxygen supplied will be in the range of from .2 to 2.0 mols per mol of organic compound to be dehydrogenated and for most dehydrogenations this will be within the range of .25 to 1.5 mols of oxygen per mol of organic compound.

Halogen or other additives may be present in the dehydrogenation step such as disclosed in the above cited patents, e.g. U.S. 3,334,152 issued Aug. 1, 1967. Means for separating halogen may also be incorporated in the dehydrogenation reactor or downstream.

Preferably, the reaction mixture contains a quantity of steam or diluent such as nitrogen with the range generally being between about 1 or 2 and 40 mols per mol of organic compound to be dehydrogenated.

The temperature for the dehydrogenation reaction generally will be at least about 250° C., such as greater than about 300° C. or 375° C., and the maximum temperature in the reactor may be about 700° C. or 800° C. or perhaps higher such as 900° C. under certain circumstances. However, excellent results are obtained within the range of or about 350° C. to 700° C., such as from or about 400° C. to or about 675° C. These temperatures are measured at the maximum temperature in the dehydrogenation zone.

The remaining conditions, catalysts, flow rates and the like for oxidative dehydrogenation are known to those skilled in the art and may be, e.g., as disclosed in U.S. 3,334,152 issued Aug. 1, 1967, or any of the remaining patents cited herein.

The invention can best be illustrated by a specific example. Reference is made to the drawing for the various pieces of equipment and streams. A hydrocarbon stream comprising butene-2 as the major component is dehydrogenated to butadiene-1,3 in reactor A. The feed 1 to the reactor includes air and steam. The effluent 2 from the reactor comprises butadiene-1,3, unreacted butene, carbonyl compounds, steam, noncondensable gaseous components such as nitrogen and various dehydrogenation by-products such as $CO_2$. The effluent is cooled and most of the water is removed in the stream condensation zone B. The gaseous stream is then compressed in the compression zone C. The compressed gases at point 3 comprise by mol percent approximately a total of 64.5 percent noncondensable gases (mostly nitrogen, but also includes the other residual gases of air, as well as CO and $CO_2$) and 32.3 percent hydrocarbon. The hydrocarbon portion is primarily $C_4$'s with butadiene-1,3 being the major component. The composition also contains 2.6 percent water and by chromatographic analysis 0.15 percent acetaldehyde, 0.1 percent crotonaldehyde, .05 percent acrolein and .01 percent methacrolein. The suction gases are at a temperature of 110° F. and 35 p.s.i.g.

The compressor is operated at a discharge pressure of 170 p.s.i.g. and temperatures of 225° F. at point 4. The compressor is handling 5780 cubic feet of gas per minute (calculated at standard conditions of atmospheric pressure and 60° F.). The compressor spray to each cylinder is illustrated in FIG. 2 of the drawing. The water to the sprays is condensate and is fed at a rate of 0.5 gallon per minute per cylinder and is at a temperature of 205° F. and a pressure of 65 p.s.i.g. The atomizing gas is obtained downstream from the oil absorber overhead gases with these gases comprising primarily the residual inert gases from air after most of the oxygen has been removed, CO, and $CO_2$. The major component of this gas is nitrogen. The water is atomized in an atomizing nozzle and sprayed into the annular space at the entrance to the cylinder. The mixture of suction gases and atomized water is drawn into the cylinder through the inlet valves. Under these conditions, the water is vaporized prior to or in the cylinder. The cylinder is lubricated by oil injection directly into the cylinder and the water spray does not prevent proper functioning of this lubrication. After a period of months, the cylinders are inspected and appear in good condition.

The compressed gases may be treated to further separate and purify the gases such as by extractive distillation, CAA extraction, fractional distillation and the like.

I claim:

1. In a process for the purification of gaseous compositions comprising unsaturated organic compounds and carbonyl compounds wherein the said gaseous composition is compressed with a compressor the improvement comprising spraying water into the suction side of the compressor.

2. The process of claim 1 wherein the said gaseous composition has been obtained by the oxidative dehydrogenation of a hydrocarbon.

3. The process of claim 1 wherein the said water is sprayed by atomizing the water with an atomizing gas.

4. The process of claim 1 wherein the compressor is a reciprocating type compressor.

5. The process of claim 1 wherein the water is sprayed into the suction line of the compressor.

6. The process of claim 1 wherein the said unsaturated organic compound is a hydrocarbon.

7. The process of claim 1 wherein the said unsaturated organic compound is butadiene-1,3.

8. The process of claim 1 wherein the said gaseous composition being compressed comprises from 3.5 to 80 mol percent of unsaturated hydrocarbon and from about 20 to 93 mol percent noncondensable gases.

9. The process of claim 1 wherein the said gaseous composition being compressed comprises from about .0005 to 2.5 mol percent carbonyl compounds.

10. The process of claim 1 wherein the said water that is sprayed into the suction side of the compressor is essentially completely vaporized prior to discharge from the compressor cylinder.

11. The process of claim 1 wherein the said compressor is lubricated with an oil injected into the cylinder.

12. The process of claim 1 wherein the temperature of the discharge gases from the compressor are reduced by at least 15° F. due to the said water spray.

13. The process of claim 1 wherein more than one stage of compression is employed and the said water spray is sprayed into the second stage of compression.

14. The process of claim 1 wherein the compressor utilizes double acting pistons.

15. The process of claim 2 wherein the said oxidative dehydrogenation process is conducted by reacting an oragnic compound to be dehydrogenated with oxygen and halogen in a dehydrogenation reactor.

16. The method of claim 3 wherein the said atomizing gas is obtained as absorber overhead gas from an oil absorber for the absorption and separation of unsaturated organic compounds from unabsorbed gases.

17. The method of claim 1 wherein the said compressor has the cylinders cooled with a water jacket.

18. The process for the compression of a mixture obtained by the oxidative dehydrogenation of a member selected from the group consisting of propane, n-butane, n-butene, n-pentane, isopentane, methyl butene and mixtures thereof to provide a gaseous mixture comprising on a water free basis from 3.5 to 80 mol percent noncondensable gases and from about .0005 to 2.5 mol percent carboyl compounds, the said gaseous mixture being compressed in a reciprocating type compressor wherein the cylinders are cooled with a water jacket and wherein water is atomized and sprayed into the suction line to the cylinder of said compressor and thereby reducting fouling of the compressor cylinder and piston.

References Cited

UNITED STATES PATENTS

| | | | |
|---|---|---|---|
| 3,050,572 | 8/1962 | Masterton et al. | 260—680 |
| 3,334,152 | 8/1967 | Bajars et al. | 260—680 |
| 3,402,215 | 9/1968 | Woerner et al. | 260—680 |

G. E. SCHMITKONS, Assistant Examiner

DELBERT E. GANTZ, Primary Examiner

U.S. Cl. X.R.

203—9; 208—48; 260—666.5, 681.5, 683.3

PO-1050
(5/69)

UNITED STATES PATENT OFFICE
CERTIFICATE OF CORRECTION

Patent No. 3,531,541  Dated Sept. 29, 1970

Inventor(s) Rudolph C. Woerner

It is certified that error appears in the above-identified patent and that said Letters Patent are hereby corrected as shown below:

Col 2, line 64, after "about", first occurrence, please delete --- about ---.

Col. 6, line 12, reads " 0.1 percent crotonaldehyde," but should read --- .01 percent crotonaldehyde ---.

Claim 18, lines 5 and 6, after "mol percent" please insert --- unsaturated hydrocarbon, from 20 to 93 mol percent ---.

SIGNED AND
SEALED
DEC 22 1970

(SEAL)
Attest:

Edward M. Fletcher, Jr.
Attesting Officer

WILLIAM E. SCHUYLER, JR.
Commissioner of Patents